United States Patent
Feilleux et al.

(10) Patent No.: US 12,339,474 B2
(45) Date of Patent: Jun. 24, 2025

(54) REFLECTIVE DIFFRACTION GRATING RESISTANT TO AN ULTRA-SHORT-PULSE LIGHT FLUX WITH HIGH PEAK POWER AND METHOD FOR THE PRODUCTION THEREOF

(71) Applicant: HORIBA FRANCE SAS, Palaiseau (FR)

(72) Inventors: Romain Feilleux, Palaiseau (FR); Amine Boussadi, Palaiseau (FR)

(73) Assignee: HORIBA FRANCE SAS, Palaiseau (FR)

( * ) Notice: Subject to any disclaimer, the term of this patent is extended or adjusted under 35 U.S.C. 154(b) by 877 days.

(21) Appl. No.: 17/594,466

(22) PCT Filed: Apr. 17, 2020

(86) PCT No.: PCT/EP2020/060822
§ 371 (c)(1),
(2) Date: Oct. 18, 2021

(87) PCT Pub. No.: WO2020/212556
PCT Pub. Date: Oct. 22, 2020

(65) Prior Publication Data
US 2022/0179137 A1 Jun. 9, 2022

(30) Foreign Application Priority Data
Apr. 19, 2019 (FR) .................... 1904240

(51) Int. Cl.
*G02B 5/18* (2006.01)
(52) U.S. Cl.
CPC ................. *G02B 5/1861* (2013.01)
(58) Field of Classification Search
CPC ...... G02B 5/1861; G02B 5/1823; G02B 5/18; G02B 26/0808; H01S 3/10; H01S 3/0057;
(Continued)

(56) References Cited

U.S. PATENT DOCUMENTS

2004/0190141 A1* 9/2004 Wolfe ................. G02B 5/0808
                                                    359/572
2005/0231806 A1* 10/2005 Barton ................ G02B 5/1857
                                                    359/566
(Continued)

FOREIGN PATENT DOCUMENTS

WO        2010/125308        11/2010
WO        2018/226539        12/2018
WO    WO-2018226539 A1 * 12/2018 ............... G02B 5/18

OTHER PUBLICATIONS

Shore et al., "Design of High-efficiency Dielectric Reflection Gratings," JOSA A, vol. 14, issue 5, May 1997, pp. 1124-1136.
(Continued)

*Primary Examiner* — Jyotsna V Dabbi
(74) *Attorney, Agent, or Firm* — NIXON & VANDERHYE

(57) ABSTRACT

Disclosed is a reflective diffraction grating including at least one intermediate metal layer arranged between the external reflective layer and a surface of the substrate including the grating lines, the external reflective layer being consisted of a first metal and the intermediate metal layer being consisted of another metal, the other metal having a higher electron-phonon coupling coefficient than the electron-phonon coupling coefficient of the first metal or metal alloy, the external reflective layer having a thickness in a range having a lower limit determined by a reflection coefficient of the first metal and an upper limit determined by a thermal diffusion length of the first metal, and the intermediate metal layer having another thickness greater than a minimum value in such a way as to increase the high peak power ultrashort pulse light flux resistance of the reflective diffraction grating.

8 Claims, 1 Drawing Sheet

(58) Field of Classification Search
CPC ..... H01S 3/08009; H01S 3/235; Y02E 30/10; Y10T 428/12472; Y10T 428/12604
USPC ......................................................... 359/569
See application file for complete search history.

(56) References Cited

U.S. PATENT DOCUMENTS

| | | | |
|---|---|---|---|
| 2006/0140538 | A1 | 6/2006 | Isano et al. |
| 2012/0093191 | A1 | 4/2012 | Desserouer |
| 2017/0248758 | A1* | 8/2017 | Miyamoto ........... G02B 6/0016 |
| 2019/0204119 | A1* | 7/2019 | Aoki ....................... G01D 5/38 |

OTHER PUBLICATIONS

Hehl et al., "High Efficiency Dielectric Reflection Gratings: Design, Fabrication and Analysis," Applied Optics, vol. 38, issue 30, Oct. 20, 1999, pp. 6257-6271.
Bonod et al., "Design of Diffraction Grating for Multipetawatt Laser Compressors," Proc. SPIE, vol. 5962, 59622M, 2005, pp. 59622M-1 to 59622M-13.
Stuart et al., "Optical Ablation by High-Power Short-Pulse Lasers," JOSA B, vol. 13, issue 2, Feb. 1996, pp. 459-468.
Tien et al., "Short-Pulse Laser Damage in Transparent Materials as a Function of Pulse Duration," Physical Review Letters, vol. 82, issue 19, May 10, 1999, pp. 3883-3886.
Britten et al., "Multilayer Dielectric Gratings for Petawatt-Class Laser Systems," Proceedings of the SPIE, vol. 5273, pp. 1-7, 2004.
Neauport et al., "Effect of Electric Field on Laser Induced Damage Threshold of Multilayer Dielectric Gratings," Optics Express, vol. 15, issue 19, Sep. 17, 2007, pp. 12508-12522.
Office Action, issued in Chinese Patent Application No. 202080044906.7 dated Oct. 28, 2023.
International Search Report for PCT/EP2020/060822, mailed Jul. 14, 2020, 5 pages.
Written Opinion of the ISA for PCT/EP2020/060822, mailed Jul. 14, 2020, 6 pages.
Hostetler et al., "Measurement of the Electron-Phonon Coupling Factor Dependence on Film Thickness and Grain size in Au, Cr, and Al", Applied Optics, vol. 38, No. 16, Jun. 1, 1999, p. 6314.
Shore et al., "Design of High-efficiency Dielectric Reflection Grating", JOSA A, vol. 14, issue 5, pp. 1124-1136, [submission pending].
Hehl et al., "High Efficiency Dielectric Reflection Gratings: Design, Fabrication and Analysis", Applied Optics, vol. 38, issue 30, pp. 6257-6271, [submission pending].
Bonod et al., "Design of Diffraction Grating for Multipetawatt Laser Compressors", Proc. SPIE, vol. 5962, 59622M, 2005, [submission pending].
Stuart et al., Optical Ablation by High-Power Short-Pulse Lasers, JOSA B, vol. 13, issue 2, pp. 459-468, [submission pending].
Tien et al., "Short-Pulse Laser Damage in Transparent Materials as a Function of Pulse Duration", Physical Review Letters, vol. 82, issue 19, May 10, 1999, pp. 3883-3886, [submission pending].
Britten et al., "Multilayer Dielectric Gratings for Petawatt-Class Laser Systems", Proceedings of the SPIE, vol. 5273, pp. 1-7, 2004, [submission pending].
Neauport et al., "Effect of Electric Field on Laser Induced Damage Threshold of Multilayer Dielectric Gratings", Optics Express, vol. 15, issue 19, pp. 12508-12522, [submission pending].

* cited by examiner

REFLECTIVE DIFFRACTION GRATING RESISTANT TO AN ULTRA-SHORT-PULSE LIGHT FLUX WITH HIGH PEAK POWER AND METHOD FOR THE PRODUCTION THEREOF

This application is the U.S. national phase of International Application No. PCT/EP2020/060822 filed 17 Apr. 2020, which designated the U.S. and claims priority to FR Patent Application No. 1904240 filed 19 Apr. 2019, the entire contents of each of which are hereby incorporated by reference.

TECHNICAL FIELD

The present invention generally relates to the field of diffraction gratings used in high power lasers, for example for laser pulse compression.

More particularly, it relates to a high peak power ultra-short pulse laser flux-resistant reflective diffraction grating. It also relates to the method for fabricating such a grating.

PRIOR ART

Research, in particular in the field of nuclear fusion, plasma physics and fundamental physics, nowadays uses ultrashort pulse lasers (whose pulse duration is less than ~500 fs) with higher and higher energies in order to reach peak powers approaching or exceeding a petawatt (PW).

Now, the maximum achievable power is limited by the flux resistance of the laser chain optical components. The laser flux resistance of an optical component depends in particular on the pulse energy density per surface unit and duration.

The damage threshold problems of optical components in high energy pulse lasers have been partially solved by the CPA (Chirped Pulse Amplification) technique. The CPA principle is to temporally stretch a light pulse, hence reducing the peak power thereof, amplify the temporally stretched pulse then, at the end of the laser chain, temporally recompress the amplified pulse to obtain a high energy short pulse. Hence, the light power during the amplification can be reduced by several orders of magnitude. However, the risk of destroying an optical component persists in the stage that performs the pulse compression, based in particular on the use of diffraction gratings. Certain of these components are indeed exposed to the energy-amplified and temporally-compressed pulse that has the highest peak power. The diffraction gratings of the compressors are therefore the limiting components in terms of flux resistance.

The diffraction gratings for pulse compression are often conventional metal gratings. For pulse compression in the infrared domain (at 800 nm, 1053 nm or 1550 nm), aluminum gratings are not used because their diffraction efficiency, generally less than 90%, is not sufficient. On the other hand, silver diffraction gratings are oxidizable and thus not much used. Gratings covered with a layer of gold are rather used. Gold-based gratings offer an excellent diffraction efficiency over a wide spectral bandwidth and require no protective layer because gold is a stainless material. However, gold-based gratings suffer from a limited laser flux resistance in the femtosecond regime. Moreover, the damage threshold of a gold-based diffraction grating depends on many parameters such as the laser fluence, the duration and repetition rate of the pulses.

Another solution for increasing the diffraction efficiency and the flux resistance has been to fabricate diffraction gratings on dielectric mirrors (MLD: multi-layer dielectric). An MLD grating generally comprises an alternating stack of a significant number of layers of two fully transparent dielectric materials of different optical indices and alternated in the thickness direction and a grating formed in the last thin layer, at the surface of the multi-layer stack. These MLD gratings are described in detail in many articles, for example: "Design of high-efficiency dielectric reflection grating" by Shore et al., JOSA A, Vol. 14, Issue 5, pp. 1124-1136, "High-Efficiency Dielectric Reflection Gratings: Design, Fabrication, and Analysis" by Hehl et al., Applied Optics, Vol. 38, Issue 30, pp. 6257-6271, "Design of diffraction gratings for multipetawatt laser compressors" by Bonod et al., Proc. SPIE, Vol. 5962, 59622M (2005). These publications recommend to fabricate diffraction gratings based on fully dielectric, transparent and absorptionless materials, comprising a high number of bilayers, to allow obtaining MLD gratings whose flux resistance is two to three times better than that of the gratings comprising a single layer of gold. In theory, MLD gratings also have a higher diffraction efficiency than that of gold-based gratings. According to the applications, there is currently a competition between gold-based diffraction gratings and MLD gratings.

However, MLD gratings are more complicated and thus more expensive to fabricate than metal gratings. In addition, MLD gratings have a too limited spectral bandwidth (a few tens of nm) to be used on the ultrashort pulse (<50 fs) laser chains. Indeed, the duration of the laser pulse is linked by a Fourier transform to the spectral bandwidth of the laser, which means that the product of the pulse duration by the spectral bandwidth of the light ray is a constant. By way of information, at the central wavelength of 800 nm, commonly used today, this product is equal to about 1000 fs·nm, which means that, to obtain a pulse of time width less than 10 fs, it is necessary to have a bandwidth of more than 100 nm. It is herein talked about a very high efficiency bandwidth (>90%) on a wavelength domain surrounding the central wavelength of interest. An MLD diffraction grating cannot have this type of bandwidth performance. MLD gratings have a bandwidth of typically less than 50 nm at the central wavelength of 1053 nm.

The flux resistance of the optical elements (materials, mirrors, diffraction gratings) exposed to laser pulses is still a vast field of investigation where all the phenomena are not yet explained. The damages induced in the materials by a laser flux in nanosecond to picosecond pulse regimes are quite well known by now. In the femtosecond domain, new phenomena occur and the damage mode is different.

In the picosecond and nanosecond regimes, the main phenomena are of thermal nature and linked to the absorption, in particular for the metal gratings. Whatever the material, the damage threshold follows a square-root law of the pulse duration. The following articles describe a certain number of laser damage measurements and models on mirrors and diffraction gratings: "Optical ablation by high-power short-pulse lasers" by Stuart et al., JOSA B, Vol. 13, Issue 2, pp. 459-468, "Short-pulse laser damage in transparent materials as a function of pulse duration" by Tien et al, Physical Review Letters, Volume 82, Issue 19, May 10, 1999, pp. 3883-3886.

For femtosecond pulse durations, this law is deviated from, the physical phenomena at the local scale of a grating line then seem to be linked to the square of the electric field of the electromagnetic light wave in the materials. It is hence shown by the following articles: "Multilayer dielectric gratings for petawatt-class laser systems" by Britten et al.

Proceedings of the SPIE, Volume 5273, pp. 1-7 (2004), "Effect of electric field on laser induced damage threshold of multilayer dielectric gratings" by Neauport et al, Optics Express, Vol. 15, Issue 19, pp. 12508-12522, that the damage of the diffraction gratings in the femtosecond regime (pulse duration less than 500 fs) is strongly linked to the squared value of the electric field in the material constituting the profile of the diffraction grating lines.

Indeed, for very efficient diffraction gratings (i.e. whose diffracted energy is almost fully concentrated in the useful diffraction order (order −1 for this type of grating), there is formation of stationary waves due to the interference of the incident field with the diffracted field and the electric field can have an amplitude twice that of the incident field near or inside the material. It is then talked about electric field reinforcement.

There exist conventional metal diffraction gratings operating in TE or TM polarization with a metal treatment, generally gold. The electric field at the metal and the metal-vacuum interface exhibits areas of significant reinforcement of the electromagnetic field at certain points of the line profile that constitute the weakness areas for the flux resistance.

The laser flux resistance of course also depends on the quality of fabrication of the grating and, in particular, the purity of the materials used, their density, the absence of impurities or defects (cracking, inclusion, bubbles, roughness).

Patent document WO2010/125308_A1 describes a reflective diffraction grating comprising a metal surface forming grating lines covered with a thin dielectric layer. This diffraction grating structure aims to push the interference areas of the electric field out of the diffraction grating. Such a metal-dielectric grating has a very high diffraction efficiency and a better light flux resistance in the femtosecond regime.

However, generally, it is desirable to still push back the damage threshold of a diffraction grating intended to be exposed to a very high energy, ultrashort pulse light flow.

Moreover, it is desirable to improve the spectral response, i.e. to increase the diffraction efficiency and/or the spectral bandwidth, of a diffraction grating having an improved flux resistance.

However, the modelling of the physical phenomena in ultrashort light pulse regime is very difficult and does not make it possible, in the current state of knowledge, to predict the response of any diffraction grating to an intense laser flux and even less to propose a diffraction grating structure having at the same time an improved flux resistance and a high diffraction efficiency on a wide spectral bandwidth.

DISCLOSURE OF THE INVENTION

In order to remedy the above-mentioned drawback of the state of the art, the present invention proposes a high peak power ultrashort pulse light flux-resistant reflective diffraction grating, the diffraction grating comprising grating lines formed on a surface of a substrate and an external reflective layer.

More particularly, it is proposed according to the invention a diffraction grating including at least one intermediate metal layer arranged between the external reflective layer and the substrate surface including the grating lines, the external reflective layer having an interface with the intermediate metal layer, the external reflective layer being consisted of a first metal and the intermediate metal layer being consisted of another metal, the other metal having a higher electron-phonon coupling coefficient than the electron-phonon coupling coefficient of the first metal, the external reflective layer having a thickness in a range having a lower limit determined by a reflection coefficient of the first metal and an upper limit determined by a thermal diffusion length of the first metal, and the intermediate metal layer having another thickness greater than a minimum value in such a way as to increase the high peak power ultrashort pulse light flux resistance of the reflective diffraction grating.

In the present document, it is meant by "first metal" a material consisted of pure metal or a metal alloy.

Similarly, it is meant by "another metal" a material consisted of another pure metal or another metal alloy.

The so-obtained diffraction grating operates on a wide spectral bandwidth, adapted for pulse compression with a preserved diffraction efficiency compared to a conventional diffraction grating having gold lines. The operating domain of the so-obtained diffraction grating is extended both in duration, for ultrashort pulses of duration less than 20 fs, and in fluence, allowing it, for example, to resist to a fluence of more than 100 mJ·cm$^{-2}$ with a pulse of 25 fs.

Other non-limitative and advantageous features of the diffraction grating according to the invention, taken individually or according to all the technically possible combinations, are the following:

the first metal is chosen among gold and silver, or an alloy of gold and/or silver and/or another material, for example a gold-nickel, gold-copper, gold-silver, gold-silver-iridium or gold-copper-silver-iridium alloy;

preferably, the first metal is gold or a gold alloy;

the thickness of the external reflective layer is between 100 nm and 500 nm, and preferably between 100 and 150 nm;

the other metal is chosen among nickel, copper, molybdenum, chromium, silver or a silver-iridium alloy;

the thickness of the intermediate metal layer is between 20 nm and 250 nm, for example between 50 nm and 150 nm.

In a particular and advantageous embodiment, the diffraction grating further includes an adhesion layer arranged on the substrate surface comprising the grating lines, the adhesion layer being arranged between the substrate surface and the intermediate metal layer, the adhesion layer having a thickness less than 25 nanometers, preferably less than 10 nm.

Advantageously, the adhesion layer is made of chromium or titanium.

Advantageously, the substrate is made of silica, silicon, zerodur, pyrex or borosilicate (BK7).

Preferentially, the grating lines are formed in the substrate. As an alternative, the grating lines are formed by a photosensitive resin deposited on the substrate.

Advantageously, the diffraction grating further includes a dielectric thin-film coating formed at the surface of the external reflective layer.

In a particular and advantageous embodiment, the diffraction grating further includes at least another intermediate metal layer arranged between the substrate and the intermediate metal layer, the intermediate metal layer and the other intermediate metal layer forming a stack of several intermediate metal layers.

The invention also proposes a method for fabricating a reflective diffraction grating comprising the following steps: forming diffraction grating lines on a surface of a substrate; depositing an intermediate metal layer, and depositing an external reflective layer, the external reflective layer having an interface with the intermediate metal layer, the external reflective layer being consisted of a first metal and the intermediate metal layer being consisted of another metal, the other metal having a higher electron-phonon coupling coefficient than the electron-phonon coupling coefficient of the first metal, the external reflective layer having a thickness in a range having a lower limit determined by the reflection coefficient of the first metal and an upper limit determined by a thermal diffusion length of the first metal, the intermediate metal layer having another thickness greater than a minimum value in such a way as to increase the high peak power ultrashort pulse light flux resistance of the reflective diffraction grating.

According to a particular and advantageous embodiment, the method further includes an additional step of depositing an adhesion layer on the grating lines before the step of depositing the intermediate metal layer.

Of course, the different features, alternatives and embodiments of the invention can be associated with each other according to various combinations, insofar as they are not mutually incompatible or exclusive.

BRIEF DESCRIPTION OF THE DRAWINGS

Moreover, various other features of the invention will be apparent from the appended description made with reference to the drawings that illustrate non-limitative embodiments of the invention, and wherein.

Figure 1:
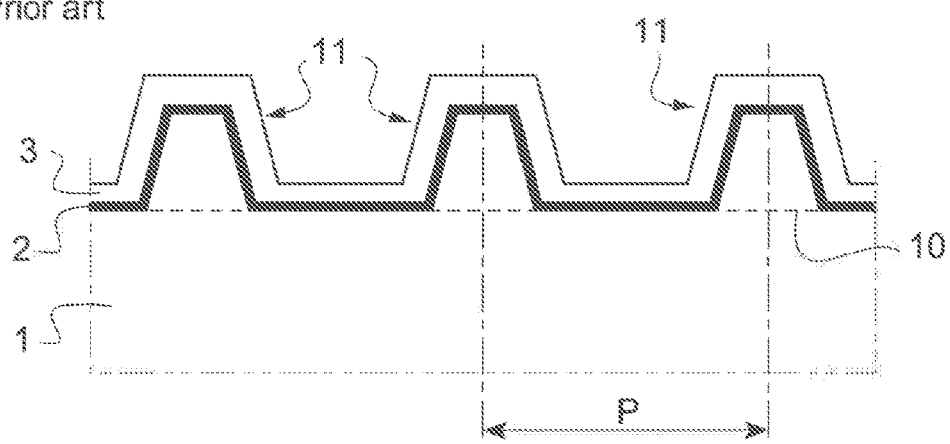
FIG. 1 schematically shows a sectional view of a few lines of a metal diffraction grating according to the prior art, in a plane transverse to the direction of the grating lines.

It is to be noted that, in these figures, the structural and/or functional elements common to the different alternative embodiments can be denoted by the same references.

DETAILED DESCRIPTION

The present disclosure relates in particular to a method for improving the laser flux resistance of metal reflective diffraction gratings subjected to ultra-intense and ultrashort laser pulses (pulse duration <500 fs).

The current working spectral domain in the field of ultrashort lasers is located in the near infrared (700 nm-1100 nm). The ultrashort pulses are mainly made at a central wavelength of 800 nm, the middle of the gain range of the Ti:sapphire crystal the most commonly used in the ultrashort pulse laser chains.

The fabrication of a diffraction grating will now be considered.

The substrate 1 is generally made of silica, silicon or formed from an optical ceramic matrix (for example, of the Zerodur, Pyrex or BK7 type). A surface 10 of the substrate 1 is previously polished in such a way as to have a residual surface roughness less than a fraction of the wavelength used. The surface 10 can be planar, concave or convex. By a method known by the one skilled in the art, diffraction grating lines 11 are formed on the surface 10 of the substrate 1. A known method is based on the direct etching of the surface of a substrate to form the grating lines. Another known method is based on a technique of holography from a master grating and of photolithography applied to a photosensitive resin layer deposited on the substrate. The lines extend in a direction generally parallel to the surface of the substrate. The profile of the grating lines in a plane transverse to the direction of the lines can be of square, rectangular, trapezoidal or pseudo-trapezoidal, symmetrical or asymmetrical triangular shape with respect to a plane transverse to the surface 10 of the substrate comprising the direction of the grating lines or also sinusoidal or pseudo-sinusoidal shape. The pitch P of the diffraction grating is generally between about 800 and 2400 lines/mm.

Advantageously, it is also known to deposit, for example by evaporation, a thin adhesion layer 2 on the surface including the lines 11 of the diffraction grating. The thin adhesion layer 2 is generally a thin layer of chromium or titanium having a thickness of a few nanometers (less than about 25 nm and preferably less than 10 nm). A reflective metal layer 3 is formed, for example by evaporation, on the thin adhesion layer 2. As an alternative, in the absence of an adhesion layer, the reflective metal layer 3 can be formed directly on the surface of the diffraction grating lines 11. The reflective metal layer 3 is generally made of gold or aluminum, sometimes silver. The thickness of the reflective layer 3 is generally between 100 nm and 500 nm. This thickness makes is possible to obtain a high reflection coefficient and hence a high diffraction efficiency while limiting the surface roughness of the grating lines.

FIG. 1 illustrates an example of metal diffraction grating of the prior art comprising a substrate 1, diffraction grating lines 11 formed on a surface 10 of the substrate, for example by photolithography in a photosensitive resin layer, a thin adhesion layer 2 deposited on the grating lines 11, a reflective metal layer 3 deposited on the thin adhesion layer 2.

A finding within the scope of the present disclosure is that the damage of a conventional metal diffraction grating with a gold layer following an exposure to a very high energy, ultrashort pulse light flux leads to the formation of craters resulting from a gold layer melting phenomenon. At the gold layer and the gold-vacuum interface, the light flow corresponds to an electric field that exhibits areas of significant reinforcement of the field at certain points of the grating profile that constitute the weakness areas for the very high energy, ultrashort pulse laser flux resistance.

Contrary to a metal-dielectric grating, which aims to push the electric field maxima out of the diffraction grating, the present disclosure proposes to replace the reflective metal layer 3 of a conventional grating by a stack of at least two metal layers comprising an external reflective layer 13 intended to be exposed to the incident light flow and at least another underlying intermediate metal layer 14. The external reflective layer 13 and the intermediate metal layer 14 are consisted of different metals and each have a thickness adapted to reduce the temperature in the external reflective layer 13.

However, there currently exist no stimulation model taking into account the distribution of an electromagnetic field of ultrashort pulses coupled to a diffraction grating comprising a stack of multi-metal thin layers. Indeed, the diffraction gratings have a two-dimensional structure that changes the spatial distribution of the electromagnetic field. Consequently, the modelling is far more complex for a reflective diffraction grating than for a planar reflective mirror.

On the one hand, it is chosen for the external reflective layer a first metal having a high reflection coefficient in the spectral range of interest and a relatively small thickness. On the other hand, it is selected for the intermediate metal layer(s) another metal having a high electron-phonon coupling coefficient, a high heat resistance and a sufficient thickness.

The electron-phonon coupling constant is essential in the choice of the material of the intermediate metal layer(s). The electron-phonon coupling coefficients are known for most of the metal materials. The following electron-phonon coupling coefficient values for different metals at ambient temperature are found in the scientific literature.

Table 1 indicates the electron-phonon coupling cefficients of different metals.

TABLE 1

| Metal | Electron-phonon coupling coefficient (W · m$^{-3}$ · K$^{-1}$) |
|---|---|
| Au | 2.1 × 10$^{16}$ |
| Mo | 13 × 10$^{16}$ |
| Ni | 36 × 10$^{16}$ |
| Ag | 3.1 × 10$^{16}$ |
| Cu | 10 × 10$^{16}$ |
| Cr | 42 × 10$^{16}$ |

Without being bound by an interpretation of the physical phenomena involved, the addition of an intermediate layer of a metal having a high electron-phonon coupling in contact with the external reflective layer aims to increase the heat exchange dynamics between the heating-induced electrons in the external reflective layer and the phonons of the intermediate metal layer. The combination of the external reflective layer 13 and the intermediate metal layer 14 and the respective thicknesses thereof are hence chosen in such a way as to allow the local reduction of the temperature in the external reflective layer 13. The combination of thin layers of different metals makes it possible to displace the thermal equilibrium point and to concentrate the thermal energy induced by the laser-matter interaction, preferentially at the intermediate metal layer. The latter is chosen for its higher resistance to thermal energy with respect to the external reflective layer.

Preferably, an intermediate metal layer 14 made of nickel, molybdenum, copper, chromium, silver or silver-iridium alloy is selected. The intermediate metal layer 14 has a thickness, denoted d, greater than a minimum value in such a way as to allow the absorption and diffusion of the heat coming from the external metal layer. Nevertheless, in practice, the thickness d of the intermediate metal layer 14 is less than a maximum value, on the one hand, to avoid increasing the surface roughness and, on the other hand, to preserve the shape of the grating line profile. By way of example, the intermediate metal layer 14 has a thickness d between 20 nm and 250 nm, for example between 50 nm and 150 nm.

The thickness d of the intermediate metal layer 14 is here measured along a direction transverse to the surface 10 supporting the grating lines. However, taking into account the grating line profile, the intermediate metal layer 14 has not necessarily a uniform thickness over its whole surface.

The intermediate metal layer 14 is a continuous two-dimensional layer that covers the surface of the grating lines. Likewise, the external reflective layer 13 is a continuous two-dimensional layer that covers the underlying intermediate metal layer 14.

Figure 3:
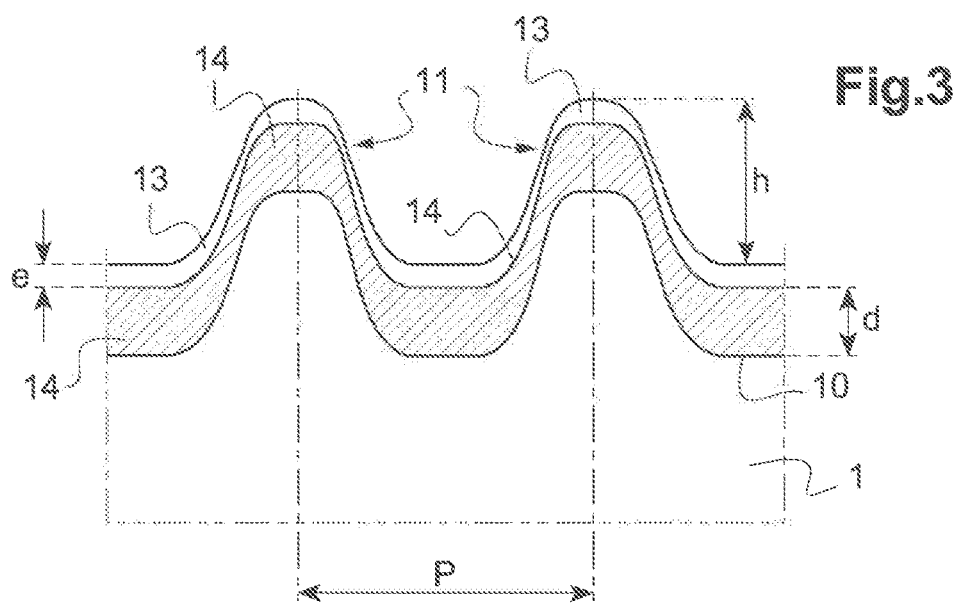
FIG. 3 schematically shows a sectional view of a few lines of a multi-metal diffraction grating according to another embodiment of the invention.

FIG. 3 illustrates, in cross-sectional view, an example of multi-metal diffraction grating with a pseudo-sinusoidal line profile, according to an embodiment of the invention. The grating lines 11 are formed directly in the substrate 1. An intermediate metal layer 14 of thickness d is deposited on these lines, and an external reflective layer 13 is deposited on the intermediate metal layer 14. The thickness e of the external reflective layer 13 and the thickness d of the intermediate metal layer 14 are small enough to preserve the depth h of the grating lines.

In an alternative embodiment, a stack of several intermediate metal layers arranged between the substrate and the external reflective layer is used. For example, a periodic stack consisted of a layer of chromium and a layer of gold is used, this two-layer pattern being repeated two times to form a total stack of four intermediate metal layers. Such a stack allows both a better mechanical damping and a metal reinforcement.

The external reflective layer 13 has a thickness, denoted e, higher than a lower limit determined by a reflection coefficient, in such a way that the diffraction grating has a high reflection rate in a spectral range extended over more than 100 nm about a central wavelength. On the other hand, the external reflective layer 13 has a thickness e less than another upper limit determined by a thermal diffusion length of the first metal. Moreover, the thickness e of the external metal layer 13 can be limited for economical reasons taking into account the cost of the first metal, in particular when the first metal is gold.

The thermal diffusion length, denoted $L_{th}$, is defined by the following equation in which D represents the diffusivity of the material: $L_{th}=\sqrt{\pi \cdot D \cdot t}$ and applies in particular to a Gaussian beam, where t represents the full width at half maximum of the laser pulse.

Table 2 indicates the thermal diffusion length of different metals.

TABLE 2

| Metal | Thermal diffusion length (×10$^{-6}$ · m$^{-2}$ · s$^{-1}$) |
|---|---|
| Au | 127.2 |
| Mo | 53.9 |
| Ni | 23 |
| Ir | 50.2 |
| Ag | 173 |
| Cu | 117 |
| Cr | 29.9 |

The thickness of the external reflective layer 13 is here measured along a direction transverse to the surface 10 supporting the grating lines. However, taking into account the grating line profile, the external reflective layer 13 has not necessarily a uniform thickness over its whole surface.

The external reflective layer 13 has generally a thickness e between about 100 nm and 500 nm, and preferably between 100 and 150 nm.

A test method is used to optimize the thicknesses of the intermediate metal layer 14 and the external reflective layer 13. Moreover, the ratio between the thickness (i) of the intermediate metal layer 14 and the thickness (r) of the external reflective layer 13 is also optimized. Preferably, this ratio i/r is between 0 and 1.

Generally, the increase in total thickness of the stack of multi-metal layers 13, 14 makes it possible to improve the volumetric heat dissipation capacity of this stack compared to a single gold metal layer.

A compromise is determined between a minimum thickness e of the external reflective layer 13 to obtain a high reflection coefficient and a maximum thickness e to ensure a good flux resistance.

By way of example, an external reflective layer 13 made of gold and an intermediate metal layer 14 made of nickel are chosen. To obtain a high reflection coefficient in a spectral band of more than 100 nm about the wavelength of 800 nm, a minimum thickness e of 100 nm is chosen for the gold external layer. In an exemplary embodiment, to increase the resistance of a diffraction grating, it appears interesting to use a 100 nm-thick gold layer and a 50 nm-thick nickel layer.

The intermediate metal layer 14 and the external reflective layer 13 are deposited by any deposition technique known by the person skilled in the art. By way of non-limitative example, a technique of evaporation is used, possibly assisted with e-beam, ion beam sputtering, cathode sputtering and/or magnetron or atomic layer deposition.

This multi-metal diffraction grating structure allows the intermediate metal layer 14, for example made of nickel, to pump a part of the thermal energy of the gold layer and to diffuse this thermal energy into the volume of the intermediate metal layer 14. This transfer of energy can be explained by a mechanism of thermalization of the electrons of the metal of the external reflective layer and transmission of a part of the thermal energy that diffuses into the underlying intermediate metal layer. This multi-metal structure makes it possible to push back the melting threshold of the external metal layer (for example made of gold) and to distribute a part of this thermal energy into the intermediate metal layer 14, for example made of nickel. Now, the melting point of nickel is higher than that of gold. Hence, the diffraction grating based on a multi-metal stack is more resistant than a diffraction grating based on a single metal layer and more resistant than a metal-dielectric diffraction grating consisted of a single metal layer covered with a stack of dielectric layers.

The so-obtained multi-metal reflective diffraction grating operates in TM or TE polarization, similarly to a reflective diffraction grating comprising a single reflective metal layer.

In an alternative, the diffraction grating includes a stack consisted of an external reflective layer 14 and at least two intermediate metal layers.

Figure 2:
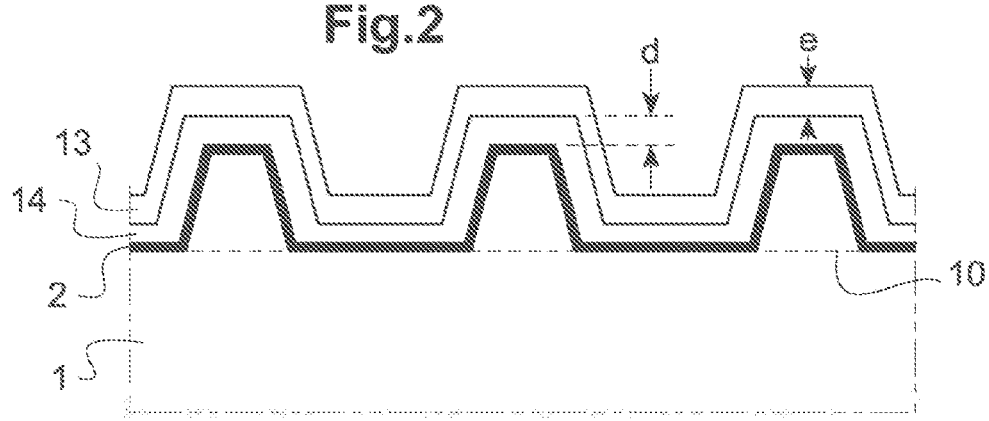
FIG. 2 schematically shows a sectional view of a few lines of a multi-metal diffraction grating according to an embodiment of the invention.

In another alternative, illustrated in FIG. 2, the multi-metal diffraction grating further includes an adhesion layer 2 arranged on the surface of the substrate 10 comprising the grating lines 11, the adhesion layer 2 being arranged between the substrate surface and the intermediate metal layer, the adhesion layer having a thickness less than 25 nanometers, and preferably less than 10 nm. The adhesion layer 2 is preferably made of chromium or titanium.

In another alternative, possibly combined with one and/or the other of the preceding alternatives, the multi-metal diffraction grating further includes a thin dielectric layer deposited on the external reflective layer 13. By way of example, the thin dielectric layer is made of silica ($SiO_2$). Preferably, the thickness of the thin dielectric layer is less than 50 nm. This thin dielectric layer has an effect on the spatial distribution of the electromagnetic field. The combination of a multi-metal grating and a thin dielectric layer makes it possible to even more push back the high energy, ultrashort pulse light flux resistance of the reflective diffraction grating.

Advantageously, the multi-metal diffraction grating operates in TM or TE polarization.

Of course, various other changes can be made to the invention within the framework of the appended claims.

The invention claimed is:

1. A high peak power ultrashort pulse light flux-resistant reflective diffraction grating, the diffraction grating comprising grating lines formed on a surface of a substrate and an external reflective layer, wherein the diffraction grating includes at least one intermediate metal layer arranged between the external reflective layer and the substrate surface including the grating lines, the external reflective layer having an interface with the intermediate metal layer, the intermediate metal layer being a continuous two-dimensional layer that covers the surface of the grating lines, the external reflective layer being a continuous two-dimensional layer covering the intermediate metal layer and having an interface with the intermediate metal layer, the external reflective layer consisting of a first metal and the intermediate metal layer consisting of another metal, the other metal having a higher electron-phonon coupling coefficient than the electron-phonon coupling coefficient of the first metal, the other metal being selected from the group consisting of nickel, copper, molybdenum, chromium, silver, and a silver-iridium alloy, the external reflective layer having a thickness between 100 nm and 500 nm, the thickness of the external reflective layer being in a range having a lower limit determined by a reflection coefficient of the first metal and an upper limit determined by a thermal diffusion length of the first metal, and the intermediate metal layer having a thickness between 20 nm and 250 nm, the thickness of the intermediate metal layer being greater than a minimum value in such a way as to increase a high peak power ultrashort pulse light flux resistance of the reflective diffraction grating, and further comprising an adhesion layer arranged on the surface of the substrate comprising the grating lines, the adhesion layer being arranged between the substrate surface and the intermediate metal layer, the adhesion layer having a thickness less than 25 nanometers.

2. The diffraction grating according to claim 1, wherein the first metal is chosen among gold and silver or an alloy of gold and/or silver or a gold-nickel, gold-copper, gold-silver, gold-silver-iridium or gold-copper-silver-iridium alloy.

3. The diffraction grating according to claim 1, wherein the adhesion layer is made of chromium or titanium.

4. The diffraction grating according to claim 1, wherein the substrate is made of silica, silicon, zerodur, pyrex or borosilicate.

5. The diffraction grating according to claim 1, wherein the grating lines are formed in the substrate or wherein the grating lines are formed by a photosensitive resin deposited on the substrate.

6. The diffraction grating according to claim 1, further including a dielectric thin-film coating formed at a surface of the external reflective layer.

7. The diffraction grating according to claim 1, further including at least another intermediate metal layer arranged between the substrate and the intermediate metal layer, the intermediate metal layer and the other intermediate metal layer forming a stack of several intermediate metal layers.

8. A method for fabricating a reflective diffraction grating comprising the following steps: forming diffraction grating lines on a surface of a substrate; depositing an intermediate metal layer, the intermediate metal layer being a continuous two-dimensional layer that covers the surface of the grating lines, and depositing an external reflective layer, the external reflective layer being a continuous two-dimensional layer that covers the intermediate metal layer, the external reflective layer having an interface with the intermediate metal layer, the external reflective layer consisting of a first metal and the intermediate metal layer consisting of another metal, the other metal being selected from the group consisting of nickel, copper, molybdenum, chromium, silver, and a silver-iridium alloy, the other metal having a higher electron-phonon coupling coefficient than the electron-phonon coupling coefficient of the first metal, the external reflective layer having a thickness between 100 nm and 500 nm, the thickness of the external reflective layer being in a range having a lower limit determined by the reflection coefficient of the first metal and an upper limit determined by a thermal diffusion length of the first metal, the intermediate metal layer having a thickness between 20 nm and 250 nm, the thickness of the intermediate metal layer being greater than a minimum value in such a way as to increase a high peak power ultrashort pulse light flux resistance of the reflective diffraction grating, and further comprising an additional step of depositing an adhesion layer on the grating lines before the step of depositing the intermediate metal layer.

\* \* \* \* \*